United States Patent

Gioutsos et al.

Patent Number: 5,251,161
Date of Patent: Oct. 5, 1993

[54] METHOD OF GENERATING MODEL CRASH WAVEFORMS FOR TESTING VEHICLE CRASH DETECTION SYSTEMS

[75] Inventors: Tony Gioutsos, Brighton; Michael A. Piskie, Bloomfield Hills, both of Mich.

[73] Assignee: Automatic Systems Laboratory, Inc., Farmington Hills, Mich.

[21] Appl. No.: 841,381

[22] Filed: Feb. 25, 1992

[51] Int. Cl.$^5$ .................. G06G 3/10; G06F 101/18; B60Q 11/00; B60R 21/00

[52] U.S. Cl. .................. 364/578; 364/424.05; 364/425; 340/436; 340/438; 180/271; 180/282; 280/735; 307/10.1

[58] Field of Search .......... 364/578, 424.05, 424.01, 364/425, 566; 307/10.1; 180/271, 282; 280/734, 735; 340/436, 438, 655

[56] References Cited

U.S. PATENT DOCUMENTS

| | | |
|---|---|---|
| 4,835,513 | 5/1989 | McCurdy et al. ............ 340/438 |
| 4,853,623 | 8/1989 | Sterler et al. ............ 324/158 R |
| 4,990,884 | 2/1991 | McCurdy et al. ............ 340/438 |
| 5,164,901 | 11/1992 | Blackburn et al. ............ 364/424.05 |
| 5,182,459 | 1/1993 | Okano et al. ............ 307/10.1 |
| 5,185,701 | 2/1993 | Blackburn et al. ............ 364/425 |
| 5,187,465 | 2/1993 | Stonerook et al. ............ 340/438 |

Primary Examiner—Jack B. Harvey
Assistant Examiner—Brian M. Buroker
Attorney, Agent, or Firm—Lyman R. Lyon

[57] ABSTRACT

A method of modeling a vehicle crash waveform to generate an infinite set of crash waveforms comprises breaking down a predetermined crash waveform into a crash pulse (signal of interest) and multiplicative noise signal. The multiplicative noise signal is then statistically characterized as a function of time. Randomly variable waveforms from a white noise generator are then modified with the statistical characterization and multiplied with the signal of interest to generate the infinite set of model crash waveforms. These model crash waveforms can then be used to evaluate the performance of crash detection system in accordance with a "Monte Carlo" probability determination technique.

8 Claims, 6 Drawing Sheets

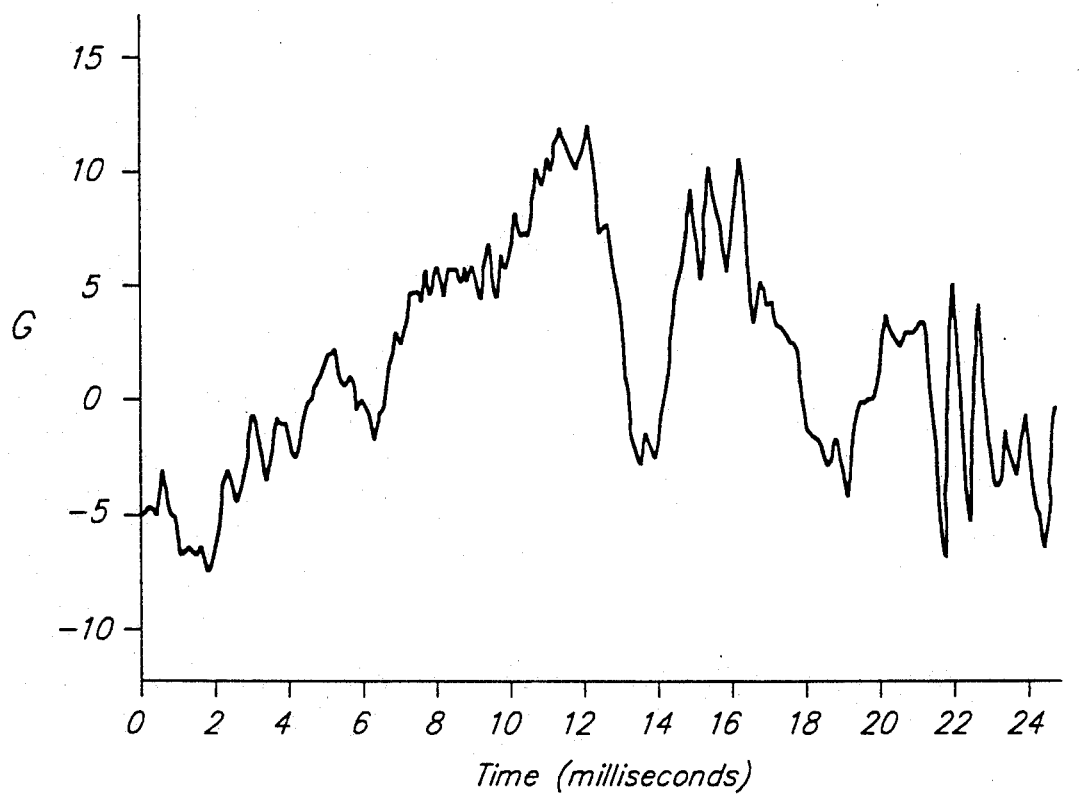
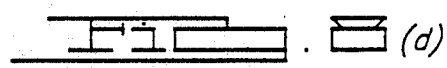

METHOD OF GENERATING MODEL CRASH WAVEFORMS FOR TESTING VEHICLE CRASH DETECTION SYSTEMS

BACKGROUND OF THE INVENTION

The present invention relates generally to vehicle crash discrimination systems, and more particularly to a method of modeling crash waveforms for evaluating and/or testing vehicle crash discrimination systems.

In the past, a small finite set of crash waveforms were typically generated for a particular vehicle model by actually crashing the vehicle under different conditions (i.e., vehicle speed, crash location, etc.). These finite sets of crash waveforms were generally used to represent all possible crash situations when testing and/or developing crash discrimination systems.

However, small finite sets of crash waveforms do not provide a reliable or realistic representation of all crash scenarios which can occur in real world situations. Thus, crash discrimination systems calibrated, or tested, using these finite sets of crash waveforms are possibly unreliable over the entire range of possible crash scenarios. Simply increasing the number of vehicles actually crashed to increase the finite sets of crash waveforms is not a realistic solution due to the extreme cost of crashing vehicles. Further, each crash involving the same vehicle and crash scenario typically generates statistically variant crash waveforms.

SUMMARY OF THE INVENTION

It is therefore an object of the present invention to provide a method of generating an infinite set of vehicle crash waveforms.

It is further a object of the present invention to provide a method of generating an infinite set of vehicle crash waveforms statistically based on an actual vehicle crash waveform.

It is also an object of the present invention to provide a method of generating an infinite set of vehicle crash waveforms statistically based on an actual vehicle crash waveform for evaluating the performance, or capability, of a crash detection system.

The present invention provides a method of modeling a vehicle crash waveform comprising the steps of separating a signal of interest from a predetermined crashed data set, generating a signal indicative of noise present in the predetermined crash data set based on the signal of interest, and generating information characteristic of the noise signal. A randomly variable waveform is generated and modified with the characteristic information. The modified randomly variable waveform is then combined (i.e. multiplied) with the signal of interest to generate the model crash waveform.

The present invention further provides a method for evaluating the performance of a vehicle crash detection system comprising the steps of separating a signal of interest from a predetermined data set, generating a signal indicative of noise present in the predetermined data set based on the signal of interest, and generating information characteristic of the noise signal. A plurality of randomly variable waveforms are generated and modified with the characteristic information. Each of the modified randomly variable waveforms are multiplied with the signal of interest to generate a plurality of model waveforms. The plurality of model waveforms are then input into the crash detection system, and the crash detection system performance is evaluated by determining an average crash detection system response to the plurality of model waveforms.

The present invention will be more fully understood upon reading the following detailed description of the preferred embodiment in conjunction with the accompanying drawings.

DETAILED DESCRIPTION OF THE PREFERRED EMBODIMENT OF THE INVENTION

Generally, a crash data set (a crash data set is the measured G values in time for a real crash) is assumed to have an underlying pulse shape. The pulse shape is usually assumed to be of haversine, half-sine or some other tapered rectangular shape. This assumption is fairly accurate when examining typical cash data sets. In fact, if the crash data is filtered down to a very small bandwidth (e.g. 10 Hz), the tapered rectangular pulse shape will often appear. In the crash data set, the crash pulse will typically be accompanied with "noise." Noise is simply that part of the crash data set that does not match the pulse shape (i.e. it does not contribute to the change in velocity).

Figure 1A:
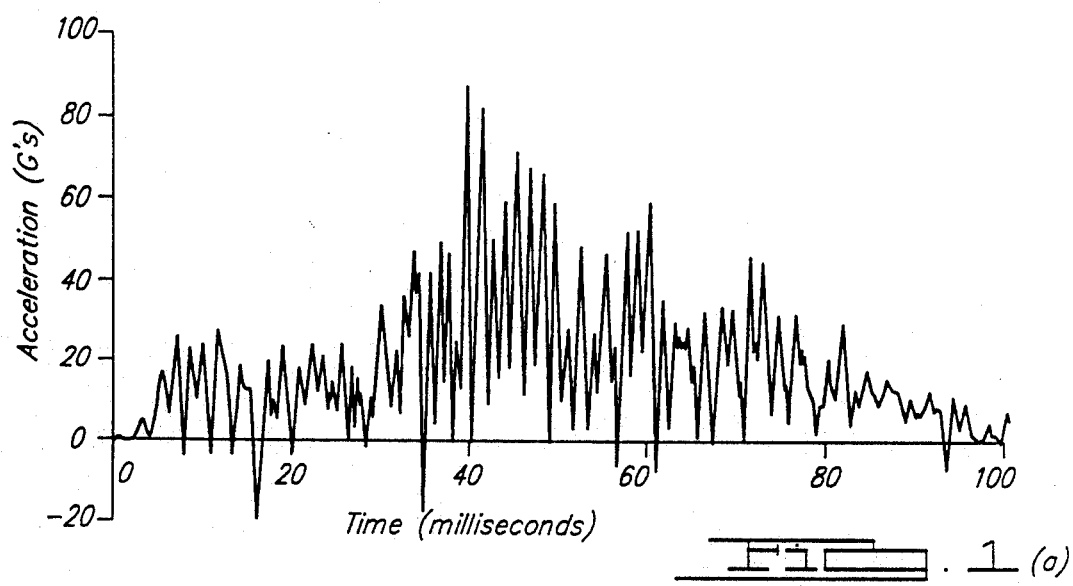
FIG. 1(a) is a graph illustrating an actual crash data set.
Figure 1B:
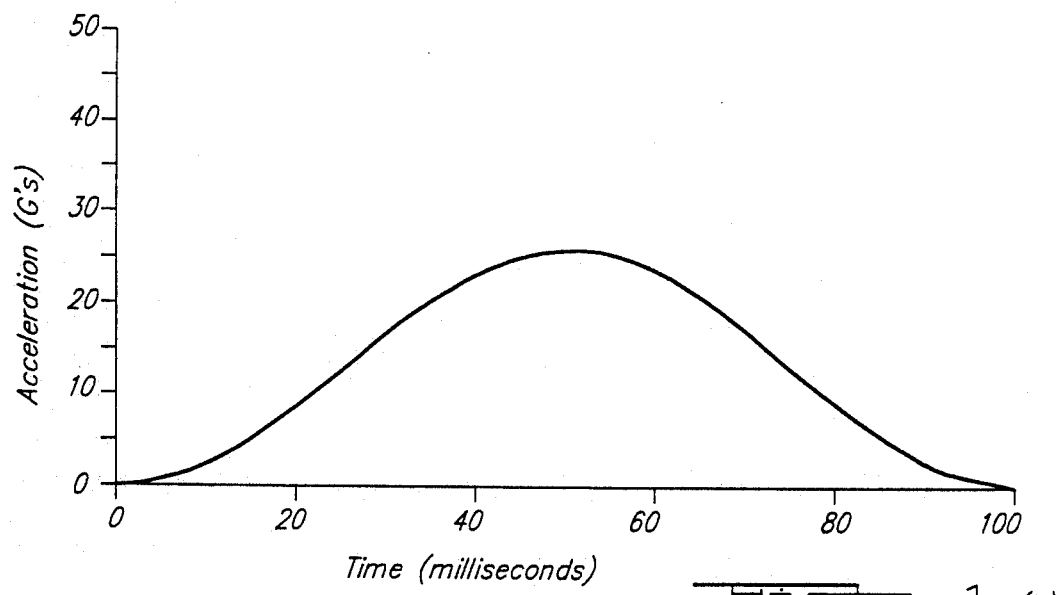
FIG. 1(b) is a graph illustrating a haversine crash pulse of FIG. 1(a)

Referring to FIG. 1(a), there is shown a plot of an actual crash data set. FIG. 1(b) illustrates a haversine pulse of appropriate length and amplitude to match the crash data set of FIG. 1(a). The haversine crash pulse is divided from the crash data set waveform to find the noise (shown in FIG. 1(c)) content. Noise corrupts the ability to detect the haversine pulse within the crash data set. In order to properly model a crash data set (waveform), the present invention models the noise element, and then adds the modeled noise element to a crash pulse.

In general, the output of a system containing a signal corrupted with noise can be written as:

$$C(t) = (1 + m(t)) \cdot h(t) + n(t) \quad (1)$$

where c(t) is the output at time t;
m(t) is the multiplicative noise term at time t;
h(t) is the signal of interest at time t; and
n(t) is the additive noise term at time t.

It is noted that m(t) can be multiplied by a heuristically developed factor to provide damping at the beginning and end of the crash data set.

In accordance with the present invention, c(t) is simply the actual crash data G value at time t (i.e. the crash data set), and h(t) is the crash pulse (e.g. haversine) at time t. The noise factors provide the most difficulty in the modeling analysis. The noise factors are based on the vehicle structure (i.e. the transfer function of the vehicle), and the crash type (i.e. the input to the transfer function of the vehicle). Since both the transfer function of every vehicle (even for the same model, due to different metal forming, temperature, construction, etc.) and the crash type are variant, so are the noise factors.

Figure 1C:
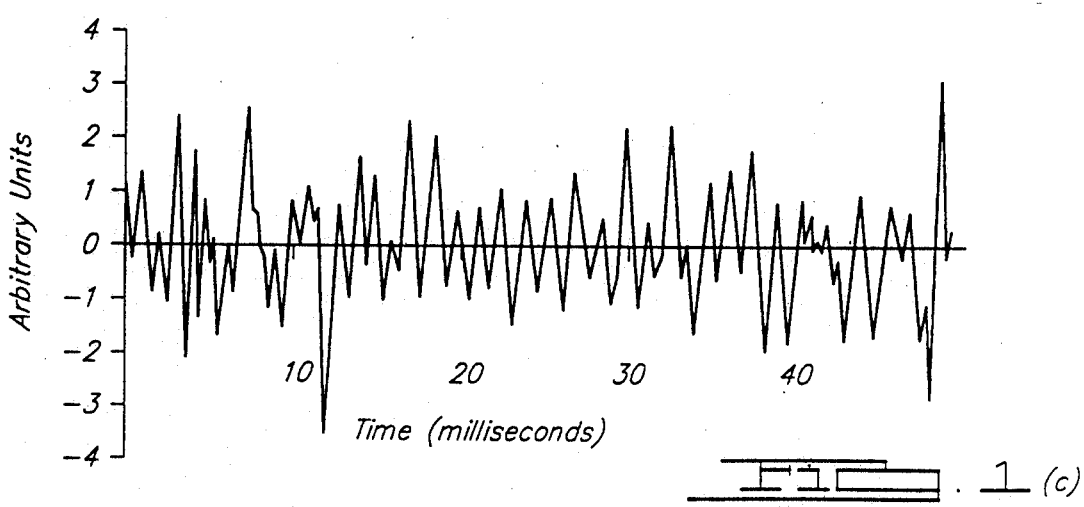
FIG. 1(c) is a graph illustrating the noise content of FIG. 1(a)

However, an observation of the noise element shown in FIG. 1(c) indicates the variance of the noise increases with increasing G values of the haversine crash pulse. This implies the multiplicative noise term is significantly larger than the additive noise term. In other words, the additive noise term is relatively insignificant. This consideration simplifies the model equation to:

$$c(t) = (1 + m(t)) \cdot h(t) \qquad (2)$$

where
c(t) is the crash data set;
m(t) is the multiplicative noise term with a given distribution; and
h(t) is the crash pulse (e.g. haversine).

Thus, from this equation the multiplicative noise term can be characterized by the following equation:

$$m(t) = \frac{c(t)}{h(t)} - 1 \qquad (3)$$

where
m(t) is the multiplicative noise term with a given distribution;
c(t) is the crash data set; and
h(t) is the crash pulse (e.g. haversine).

The multiplicative noise m(t) can further be statistically stated by the equation:

$$m(t) = b(t) \cdot dof\!t + mmof\!t \qquad (4)$$

where
m(t) is the multiplicative noise term;
b(t) is the normalized noise;
doft is the constant variance of the multiplicative noise; and
mmoft is the constant mean of the multiplicative noise.

To provide an accurate statistical characterization of the multiplicative noise term, the equation (4) is modified to reflect the variance and mean factors as functions of time.

The statistical characterization of the multiplicative noise can then be expressed as:

$$m(t) = b(t) \cdot doft(t) + mmoft(t) \qquad (5)$$

From equations (5) and (3), a crash data set c(t) can be expressed as follows:

$$c(t) = h(t) \cdot [b(t) \cdot doft(t) + 1 + mmoft(t)] \qquad (6)$$

With a variable input signal generating source, such as a white noise generator, a filter designed to use equation (6) will generate an infinite set of correlated crash data. The infinite set of correlated crash data is then processed with the statistical multiplicative noise characteristics to generate an infinite number of simulated (model) crash data sets which exhibit statistical characteristics of an actual crash waveform.

Figure 2:
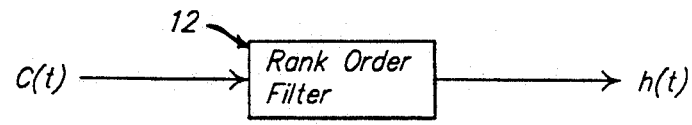
FIG. 2 is a block diagram for generating a signal of interest in accordance with the present invention.
Figure 3:
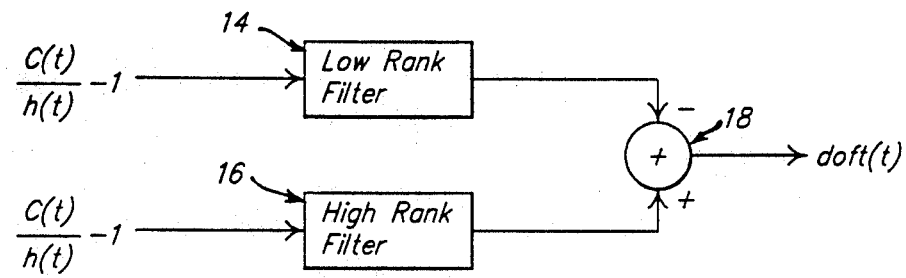
FIG. 3 is a block diagram for generating the variance function of the multiplicative noise in accordance with the present invention.
Figure 4:
FIG. 4 is a block diagram for generating the mean function of the multiplicative noise in accordance with the present invention.
Figure 5:
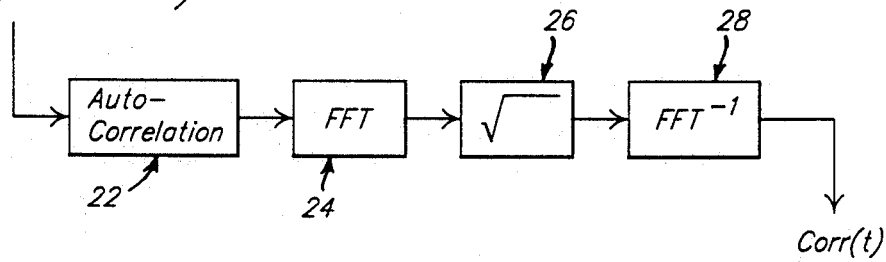
FIG. 5 is a block diagram for generating the correlative filter function in accordance with the present invention.

Referring to FIGS. 2–6, there is shown a preferred embodiment for generating a plurality of crash waveforms modeled as described above. More particularly, FIG. 2 illustrates applying an actual crash data set to a rank order filter 12 (approximately median) to generate a haversine type crash pulse h(t). To generate the multiplicative noise term, the crash data set is divided by the crash pulse h(t), and the value "1" is subtracted from the result. The variance function doft(t) is generated by summing 18 the negative low rank filter 14 and the high rank filter 16 products of the multiplicative noise, as shown in FIG. 3. The mean function mmoft(t) is produced by median filtering 20 the multiplicative noise (FIG. 4). Referring to FIG. 5, the correlative filter function corr(t) is generated by creating the normalized noise input based on equation (6). The normalized noise is then processed by the following steps: autocorrelation 22, fast fourier transform 24, square root operation 26, and inverse fast fourier transform 28.

Figure 6:
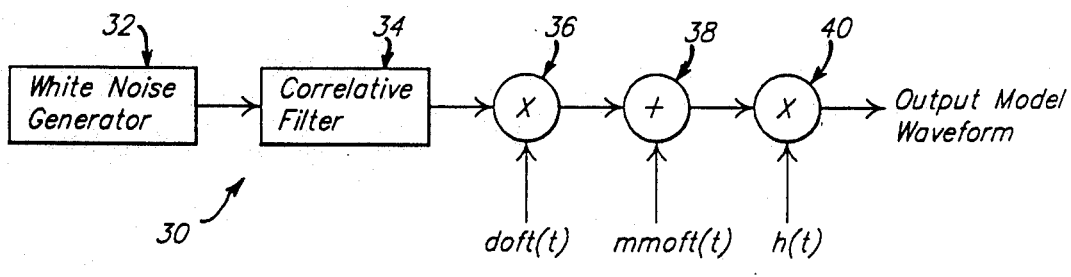
FIG. 6 is a block diagram for generating a model crash waveform in accordance with the present invention.
Figure 7A:
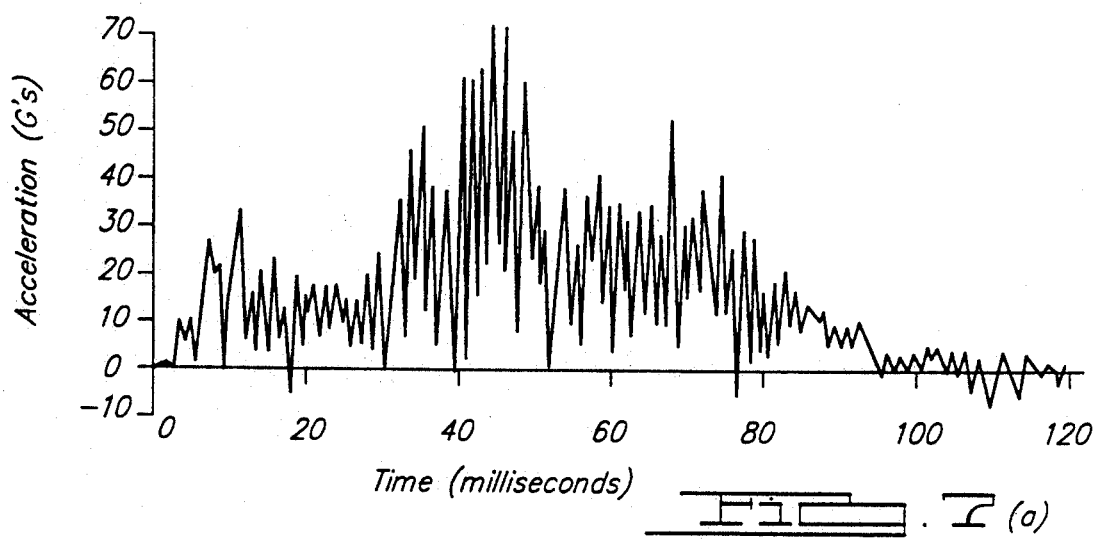
FIGS. 7(a)-(d) are plots illustrating three model crash data sets generated by the present invention with the original crash data set; and, FIG. 8(a)-(d) are graphs illustrating various rough road data sets.
Figure 7B:
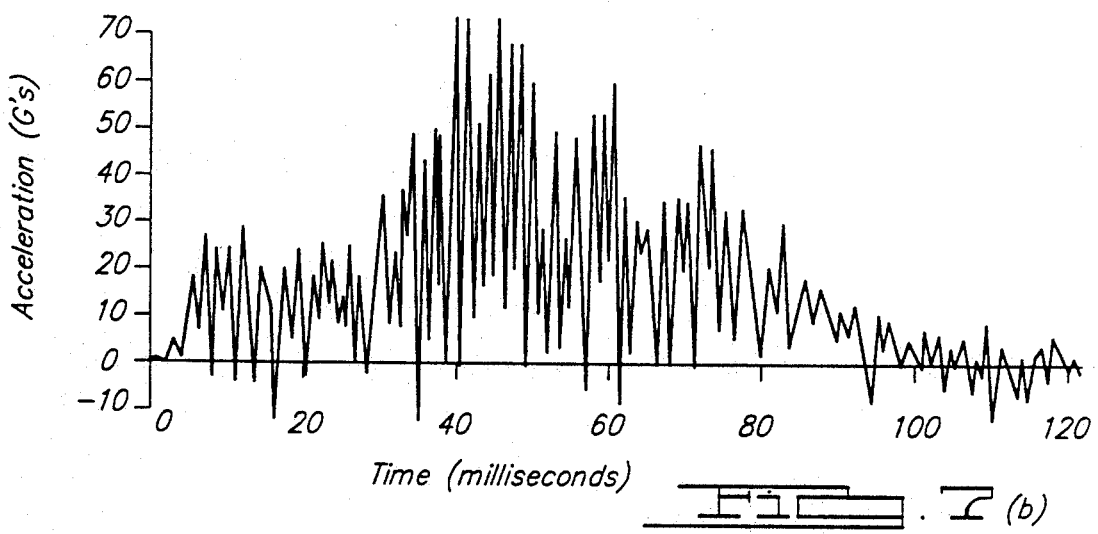
Figure 7C:
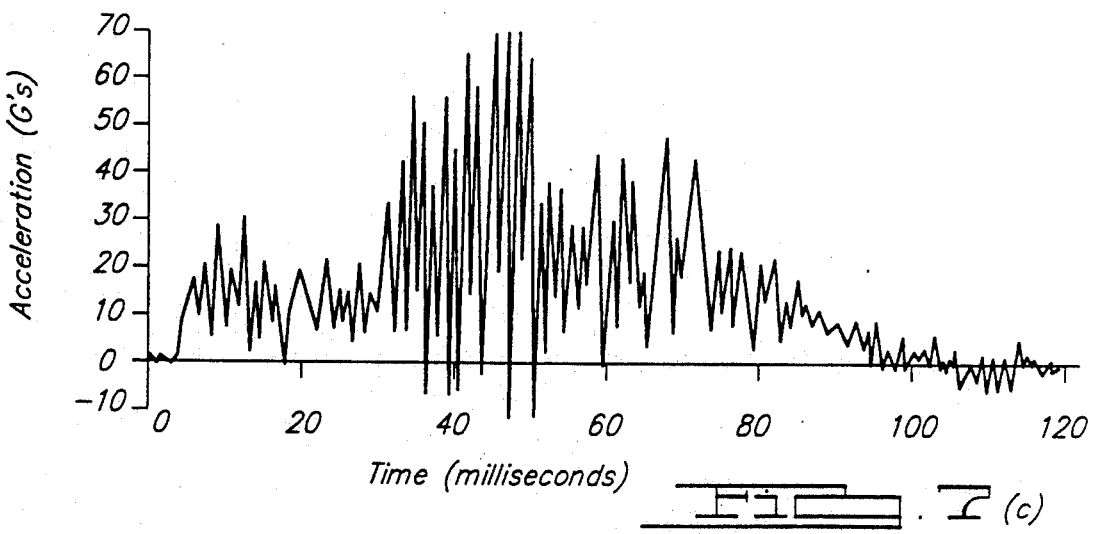
Figure 7D:
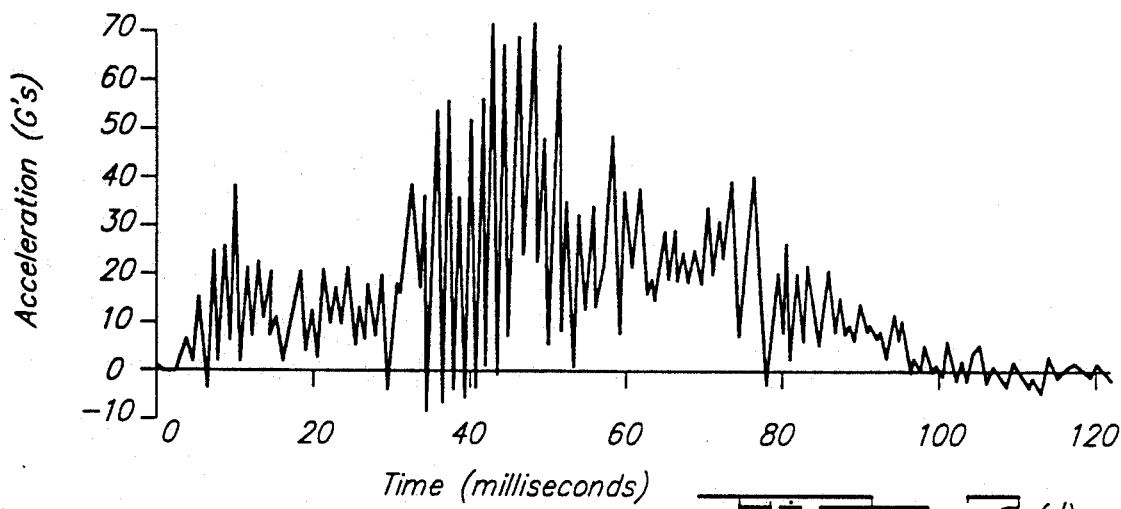

FIG. 6 shows the overall model crash waveform generator 30 utilizing the above described statistical crash waveform characteristics. The white noise generator 32 supplies a randomly variable input waveform to correlative filter 34. The variance function 36, mean function 38 and crash pulse 40 are applied to the correlated data set in accordance with equations (5) and (6) to generate an infinite set of crash waveforms exhibiting identical statistical characteristics as an actual crash data set. FIGS. 7(a), (c) and (d) show the plots of three respectively modeled crash data sets with the original crash data set (upper right corner) illustrated in FIG. 7(b).

In accordance with the present invention, rough road conditions (e.g. vehicle driving over Belgian blocks, vehicle hitting a curb, etc.) can also be modeled. Modeling rough road conditions entails the same techniques as modeling crash data sets. A known signal model can be chosen with noise included in the analysis. However, the signal model can be varied (this could have also been done with the crash pulse model by varying its width, amplitude, and shape).

Figure 8A:
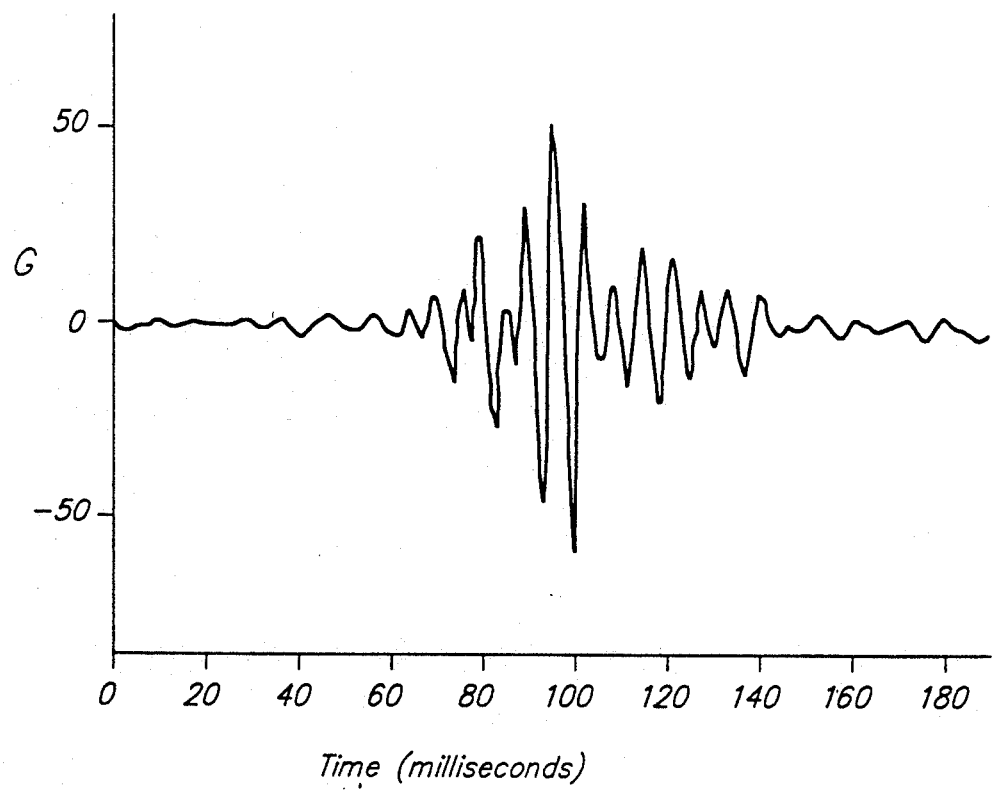
Figure 5B:
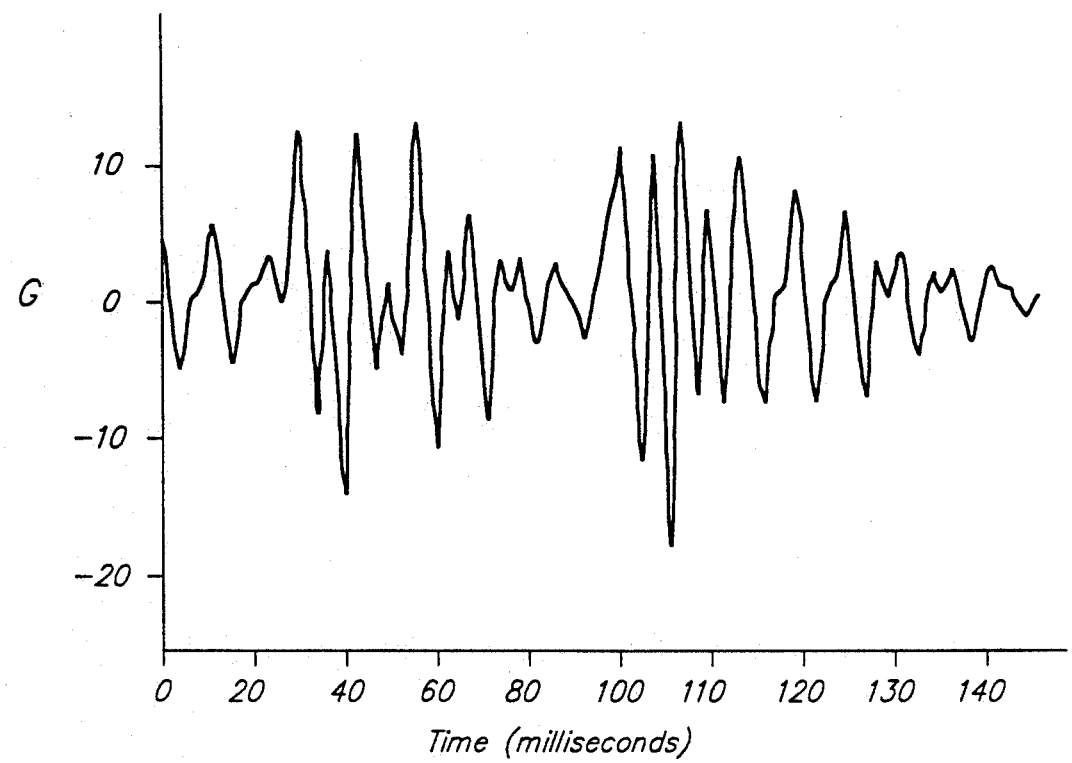
Figure 5C:
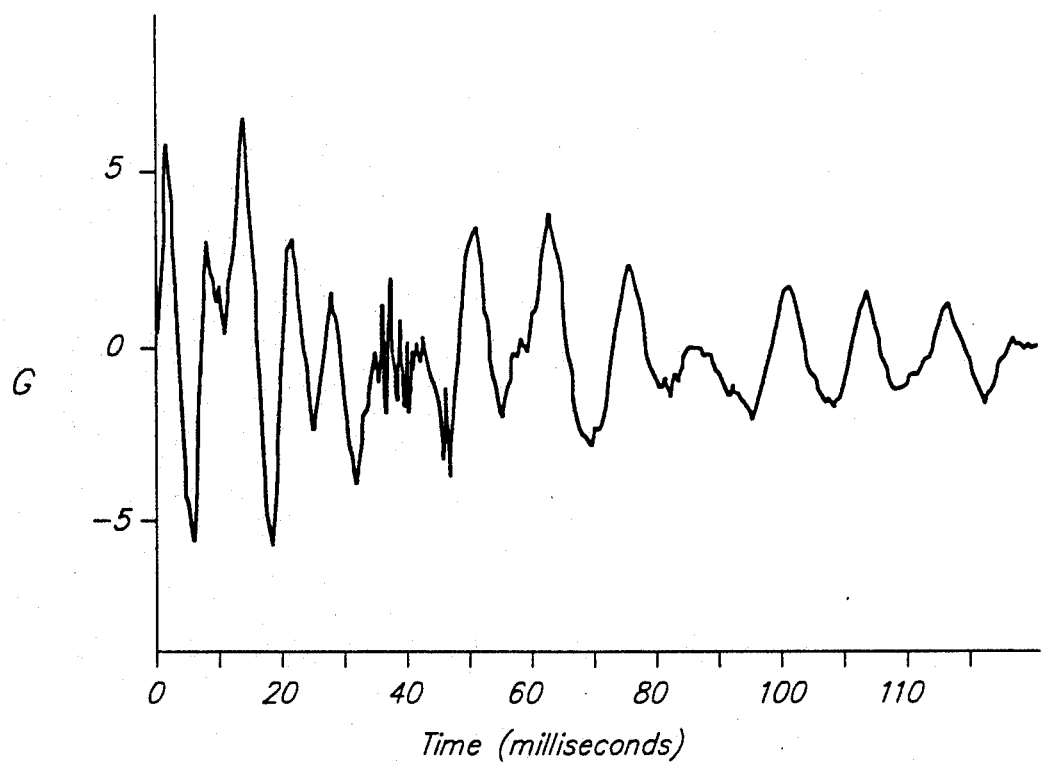

FIGS. 8(a)–(d) present four different types of rough road scenarios. FIG. 8 (a) was produced by driving a vehicle over Belgian blocks. FIG. 8(b) was produced by panic stopping the vehicle over a bumpy road. FIG. 8(c) was produced by a vehicle hitting a curb. FIG. 8(d) presents rough road of a pulse type nature. Each one of these data sets can be modeled by a signal having added noise. However, the noise element is much smaller in these scenarios, if the signal is modeled accurately. For example, the rough road in FIG. 8(a) can be modeled as:

$$r(t) = a \cdot h(t) \cdot \sin(ft) \qquad (7)$$

where
h(t) is a haversine pulse length T;
a is the amplitude of the haversine; and f is frequency of the sine wave, which is about 10 times less than T.

Varying a, f, T and h(t) would produce millions of tests of Belgian block rough road data. Noise could be added to this model if desired (multiplicative and/or additive). FIG. 8(b) could be modeled as:

$$r(t) = a \cdot \sin(f_1 t) \cdot [\sin(f_2 t)] \qquad (8)$$

where
- a is the amplitude of the rough road;
- $f_1$ is modulating sine wave frequency; and,
- $f_2$ is frequency of carrier sine wave (about 10 times greater than $f_1$).

This model is like an Amplitude Modulated (AM) signal. One sine wave modulates another sine wave's amplitude. The parameters that can be varied to run countless simulations are: a, $f_1$ and $f_2$ as well as noise if desired. FIG. 8(c) could be modeled as:

$$r(t) = a \cdot e^{-bt} \cdot \sin(f) \qquad (9)$$

where
- a is peak amplitude;
- b is decay factor of the exponential function; and
- $f_2$ is frequency of the sine wave.

This again is the modulation of a sine wave, but with an exponential instead of another sine wave. Finally, FIG. 8(d) might be modeled as:

$$r(t) = a \cdot h(t) + n(t) \qquad (10)$$

where
- a is the amplitude;
- h(t) is a haversine pulse; and
- n(t) is an additive noise term.

The parametric variables are: a, h(t) and n(t).

The above described method of crash waveform modeling can be utilized to form three different types of statistical models. The first type of model is referred to as the "same type" model. Specifically, a known crash waveform representative of certain type of vehicle crash (e.g. 30 m.p.h. into a brick wall, 30 m.p.h. into a 12" pole, etc.) is used to regenerate (simulate) an infinite number of the same type of crashes.

The second type of model is referred to as a "scaled version" model. In this model, the statistical parameters (i.e. mmoft, doft, h(t), etc.) from a known crash waveform are scaled to generate a scaled crash waveform. For example, a known 30 m.p.h. brick wall collision can be modeled to look like a 27 m.p.h. brick wall collision.

The third type of model is referred to as an "unknown type" model. In this model, the statistical parameters are all randomly varied to generate a set of random crash waveforms.

The present invention utilizes a statistical probability technique known as the Monte Carlo method to evaluate a crash detection system. As described above, the present invention provides the break down of an actual crash waveform into statistically non-variant pieces. Once the statistically non-variant pieces are known, an infinite number of crash waveforms can be generated simulating the same statistical characteristics of the actual crash waveform. The infinite number of waveforms can then be used in the Monte Carlo method to evaluate a crash detection system.

The Monte Carlo method is generally a statistical technique used for estimating solutions to problems which are too difficult to solve mathematically. The Monte Carlo method, as the name implies, originates from the casinos at Monte Carlo. The operators of the casinos wanted to know the probability (or chance) of winning (or losing) particular gambling events. One way to accomplish this is to derive the probability from known quantities. For example, the probability of rolling a seven using two dice is calculated by noting there are 36 possible combinations of the two dice, and only six of the combinations will be a seven. Therefore, the probability is 1/6th.

This approach is adequate for situations where the known quantities are relatively few in number. However, situations where the known quantities are large in number make mathematical calculations extremely difficult. On the other hand, the Monte Carlo method provides a technique which utilizes empirical observations to generate a sample average approach for determining the probability of an event occurring. For example, to determine the probability of winning at blackjack, a number of matches would be observed and the results would be recorded (i.e. x wins and y losses). The sample probability of winning would equal x/(x+y). The sample probability converges to the true probability as the quantity (x+y) approaches infinity (assuming some statistical properties like ergodicity). Thus, the Monte Carlo method entails the observation of many tests to determine the sample average probability. The larger the number of observations made, the more accurate the probability calculation will be.

In accordance with the present invention, the above described method of crash waveform modeling is advantageously used to evaluate the performance of crash detection systems under the guidelines of the Monte Carlo technique of probability determination. A large numbers of crash waveforms can be generated to provide many test observations. For evaluating crash detection systems, the following basic situations provide the best criteria:

1) Do not Fire the vehicle safety device in a No-Fire situation.
2) Fire in a No-Fire situation.
3) Do not Fire in a Fire situation.
4) Fire in a Fire situation.

The 4)$^{th}$ situation can be modified to include the timing of the fire (too late or too early).

Using appropriate models, the parameters can be varied over their defined densities as many times as desired. For example, to calculate the probability of firing the vehicle safety device when the vehicle drives through Belgian blocks, the model parameters are simply varied. In this case it would be the amplitude, pulse shape, and sinusoidal frequency. The density of each parameter's variation must also be defined. For example, the amplitude could be varied from 3 G's to 7 G's independently and uniformly. The output is an accurate estimate of the crash detection systems probability of firing when the vehicle is traveling over Belgian blocks due to accurate modeling. It should be noted that the probability of inadvertent deployment or the probability of missing deployment (one or both) should never be zero for any reasonable modeling. The present invention can be utilized to test several different crash detection systems to find the crash detection system that produces the lowest values.

Another way of measuring performance could be to use a weighted scale. For instance, assume that the vehicle is more likely to be driven on a bumpy road than a highway (e.g. 4×4), then the crash detection system performance might be weighted in the bumpy road more than its highway rough road performance.

Finally, the performance of a crash detection system could be plotted after the appropriate weighting. The plot would be 3-Dimensional where the first axis is the probability of inadvertent deployment, the second axis is the probability of firing on time for a fire condition, and the third axis is the average time that the crash detection system fires before the required time. A good crash detection system will have low values for the first axis and high values for the other two axes.

With the present invention, a model can be developed for each potential rough road or crash scenario. Then a series of data sets can be run through a crash detection system of interest to help evaluate its effectiveness. It must also be noted that the rough road models and the crash models can be combined, concatenated, etc. in any fashion desired to produce even more potential measures of performance for a crash detection system.

It will be understood that the foregoing description of the preferred embodiment of the present invention is for illustrative purposes only, and that the various structural and operation features herein disclosed are susceptible to a number of modifications and changes none of which departs from the spirit and scope of the present invention as defined in the appended claims.

We claim:

1. A method of modeling a vehicle crash waveform comprising the steps of:
    separating a signal of interest from a predetermined crash data set;
    generating a signal indicative of noise present in said predetermined crash data set based on said signal of interest;
    generating information characteristic of said noise signal;
    generating a randomly variable waveform;
    modifying said randomly variable waveform with said characteristic information; and
    combining said modified randomly variable waveform with said signal of interest to generate said model crash waveform.

2. The method of claim wherein said signal indicative of noise is representative of multiplicative noise present in said crash data set.

3. The method of claim wherein said step of generating information characteristic of said noise signal comprises determining a mean and variance of said noise signal as a function of time.

4. The method of claim 1 further comprising the step of generating a plurality of randomly variable waveforms, and wherein said steps of modifying and multiplying generate a corresponding plurality of model crash waveforms.

5. The method of claim wherein said step of combining comprises multiplying said modified randomly variable waveform with said signal of interest.

6. A method of evaluating a vehicle crash detection system performance comprising the steps of:
    separating a signal of interest from a predetermined data set;
    generating a signal indicative of noise present in said predetermined data set based on said signal of interest;
    generating information characteristic of said noise signal;
    generating a plurality of randomly variable waveforms; modifying each of said plurality of randomly variable waveforms with said characteristic information; and
    multiplying each of said modified randomly variable waveforms with said signal of interest to generate a plurality of model waveforms;
    inputting said plurality of model waveforms into said crash detection system; and
    evaluating said crash detection system performance by determining an average crash detection system response to said plurality of model waveforms.

7. The method of claim 6 wherein said step of evaluating comprises the step of determining a crash detection system actuation probability based on said average crash detection system response.

8. The method of claim 6 further comprising the step of modifying said information characteristic of said noise signal to generate a different set of plurality of model crash waveforms.

* * * * *

UNITED STATES PATENT AND TRADEMARK OFFICE
CERTIFICATE OF CORRECTION

PATENT NO. : 5,251,161

DATED : October 5, 1993

INVENTOR(S) : Tony Gioutsos and Michael A. Piskie

It is certified that error appears in the above-identified patent and that said Letters Patent is hereby corrected as shown below:

Col. 1, line 35, the word "a" should be --an--.
Col. 5, line 20, in equation (9), "($f_t$)" should be --($f_2t$)--.
Col. 5, line 30, "(10" should be --(10)--.
Claim 2, Col. 8, line 1, after "claim" insert --1--.
Claim 3, Col. 8, line 4, after "claim" insert --1--.
Claim 5, Col. 8, line 13, after "claim" insert --1--.
Claim 6, Col. 8, line 26, "modifying" is the beginning of a new subparagraph.

Signed and Sealed this

Twenty-ninth Day of March, 1994

Attest:

BRUCE LEHMAN

*Attesting Officer*   *Commissioner of Patents and Trademarks*